United States Patent
Fedotov et al.

(10) Patent No.: US 8,469,716 B2
(45) Date of Patent: Jun. 25, 2013

(54) LAPAROSCOPIC SURGERY SIMULATOR

(75) Inventors: Yevgeniy Fedotov, Aurora, CO (US);
Joshua M. Rust, Boulder, CO (US);
Sara K. Little, Palatine, IL (US);
Kryztopher D. Tung, Superior, CO (US); Ian O. Trucco, Boulder, CO (US);
Weng-Kai K. Lee, Longmont, CO (US);
Jeffrey R. Townsend, Loveland, CO (US)

(73) Assignee: Covidien LP, Mansfield, MA (US)

( * ) Notice: Subject to any disclaimer, the term of this patent is extended or adjusted under 35 U.S.C. 154(b) by 118 days.

(21) Appl. No.: 13/089,779

(22) Filed: Apr. 19, 2011

(65) Prior Publication Data
US 2012/0202179 A1 Aug. 9, 2012

Related U.S. Application Data

(60) Provisional application No. 61/325,597, filed on Apr. 19, 2010.

(51) Int. Cl.
*G09B 23/28* (2006.01)

(52) U.S. Cl.
USPC .......................................... 434/267; 434/262

(58) Field of Classification Search
USPC ................................. 434/262, 267
See application file for complete search history.

(56) References Cited

U.S. PATENT DOCUMENTS

| | | | | |
|---|---|---|---|---|
| 1,749,165 A | * | 3/1930 | Stanton | 312/208.3 |
| 5,149,270 A | * | 9/1992 | McKeown | 434/262 |
| 5,403,191 A | * | 4/1995 | Tuason | 434/262 |
| 5,425,644 A | * | 6/1995 | Szinicz | 434/268 |
| 5,518,406 A | * | 5/1996 | Waters | 434/267 |
| 5,571,126 A | * | 11/1996 | Dorsey, III | 606/167 |
| 5,620,326 A | * | 4/1997 | Younker | 434/268 |
| 5,707,351 A | * | 1/1998 | Dorsey, III | 604/30 |
| 5,722,836 A | * | 3/1998 | Younker | 434/272 |
| 5,775,916 A | * | 7/1998 | Cooper et al. | 434/267 |
| 5,947,743 A | * | 9/1999 | Hasson | 434/262 |
| 6,267,599 B1 | * | 7/2001 | Bailey | 434/262 |
| 6,659,776 B1 | * | 12/2003 | Aumann et al. | 434/262 |
| 6,857,878 B1 | * | 2/2005 | Chosack et al. | 434/267 |
| 6,887,082 B2 | * | 5/2005 | Shun | 434/267 |
| 7,023,423 B2 | * | 4/2006 | Rosenberg | 345/161 |
| 7,837,473 B2 | * | 11/2010 | Koh | 434/262 |

(Continued)

OTHER PUBLICATIONS

Song et al., "Elasticity of the Living Abdominal Wall in Laparoscopic Surgery" Journal of Biomechanics 39 (2006) pp. 587-591.

*Primary Examiner* — Kathleen Mosser
*Assistant Examiner* — James Hull (57) ABSTRACT

A surgical simulation system for demonstrating a laparoscopic surgical instrument includes a frame defining an internal cavity for supporting an object simulative of human tissue. A wall is coupled to the frame and obstructs a view of the cavity from a surgical vantage point. The wall is constructed of three adjacent layers including an outer layer simulative of skin tissue coupled to the frame by a first fastener, an intermediate layer, and an inner layer simulative of abdominal tissue. The inner layer is coupled to the intermediate layer by a second fastener such that the inner layer is removable from the intermediate layer independently of the outer layer. At least one aperture is defined through the wall to provide entry of the endoscopic surgical instrument into the cavity. A camera captures images from within the cavity transmits the images to a monitor visible from the surgical vantage point.

14 Claims, 5 Drawing Sheets

U.S. PATENT DOCUMENTS

| | | |
|---|---|---|
| 7,931,471 B2 * | 4/2011 | Senagore et al. .............. 434/267 |
| 7,997,903 B2 * | 8/2011 | Hasson et al. ................. 434/262 |
| 8,007,281 B2 * | 8/2011 | Toly ............................. 434/262 |
| 2004/0024418 A1 * | 2/2004 | Irion et al. ..................... 606/205 |
| 2005/0181340 A1 * | 8/2005 | Haluck ......................... 434/258 |
| 2005/0214727 A1 * | 9/2005 | Stoianovici et al. .......... 434/262 |
| 2006/0040245 A1 * | 2/2006 | Airola et al. .................. 434/262 |
| 2007/0166682 A1 * | 7/2007 | Yarin et al. ................... 434/267 |
| 2007/0275359 A1 * | 11/2007 | Rotnes et al. ................. 434/262 |
| 2008/0032272 A1 * | 2/2008 | Palakodeti .................... 434/262 |
| 2008/0299529 A1 * | 12/2008 | Schaller ........................ 434/267 |
| 2009/0142739 A1 | 6/2009 | Wang et al. |
| 2009/0176196 A1 * | 7/2009 | Niblock et al. ............... 434/262 |
| 2009/0263775 A1 * | 10/2009 | Ullrich ......................... 434/267 |
| 2009/0326518 A1 * | 12/2009 | Rabin ............................... 606/1 |
| 2010/0081875 A1 * | 4/2010 | Fowler et al. ................. 600/114 |
| 2010/0114033 A1 * | 5/2010 | Fischvogt ................. 604/167.04 |
| 2010/0120006 A1 * | 5/2010 | Bell et al. ..................... 434/267 |
| 2010/0167250 A1 * | 7/2010 | Ryan et al. ................... 434/267 |
| 2010/0167252 A1 * | 7/2010 | Miller .......................... 434/267 |
| 2010/0209899 A1 * | 8/2010 | Park et al. ..................... 434/272 |
| 2011/0087269 A1 * | 4/2011 | Stokes et al. ................. 606/206 |
| 2011/0238057 A1 * | 9/2011 | Moss et al. ..................... 606/33 |
| 2011/0269109 A2 * | 11/2011 | Miyazaki ...................... 434/267 |
| 2012/0015337 A1 * | 1/2012 | Hendrickson et al. ........ 434/267 |
| 2012/0082970 A1 * | 4/2012 | Pravong et al. ............... 434/262 |
| 2012/0164616 A1 * | 6/2012 | Endo et al. ................... 434/267 |

* cited by examiner

LAPAROSCOPIC SURGERY SIMULATOR

CROSS-REFERENCE TO RELATED APPLICATION

This application claims the benefit of and priority to U.S. Provisional Application No. 61/325,597, filed on Apr. 19, 2010, the entire content of which is incorporated herein by reference.

BACKGROUND

1. Technical Field

The present disclosure relates generally to an apparatus for demonstrating the use of a laparoscopic, endoscopic or other minimally invasive surgical instrument. In particular, the disclosure relates to an apparatus for simulating visual and tactile operating conditions under which the instrument may be used for minimally invasive surgery.

2. Background of Related Art

Laparoscopic surgery, sometimes referred to as minimally invasive surgery (MIS), is a procedure in which a small incision or puncture is made in the abdominal wall of a patient's body. A cannula is then inserted into a body cavity through the incision, which provides a passageway for inserting various surgical devices such as scissors, dissectors, retractors, or similar instruments. To facilitate operability through the cannula, instruments adapted for laparoscopic or endoscopic surgery typically include a relatively narrow, elongated shaft extending distally from a housing, and supporting an end effector at a distal end thereof. Arranging the shaft of such an instrument through the cannula allows a surgeon to manipulate actuators on the housing from outside the body to induce the end effector to carry out a surgical procedure at a remote internal surgical site. To view the end effector of a laparoscopic instrument within an internal body cavity, a viewing scope may be inserted through an additional puncture in the abdomen. The viewing scope may transmit images to an external monitor that may be viewed by the surgeon. This type of minimally invasive procedure has proven beneficial over traditional open surgery due to reduced trauma, improved healing and other attendant advantages.

Devices and techniques have been developed for the use of an artificial human abdomen in which a laparoscopic surgical procedure may be simulated for demonstration, training or other purposes. These devices typically include a simulated abdominal wall, which obstructs a view of a simulated operative site, and a mechanism for remotely viewing the simulated operative site. A simulator may be constructed to represent the conditions expected for a particular procedure on a particular type of patient. Since each surgical procedure is unique, various techniques may be practiced more readily on a simulator that is adjustable to accommodate a unique expected operating environment.

SUMMARY

The present disclosure describes a surgical simulation system for demonstrating the operation of a laparoscopic surgical instrument. The system includes a frame defining an internal cavity therein, a mount configured to support an object simulative of human tissue within the cavity, and at least one wall coupled to the frame and obstructing a view of the cavity from a surgical vantage point. The at least one wall is constructed of three adjacent layers including an outer layer simulative of skin tissue that is coupled to the frame by a first fastener, an intermediate support layer intimately coupled to the frame, and an inner layer simulative of abdominal tissue that is coupled to the intermediate support layer by a second fastener such that the inner layer is selectively removable from the intermediate support layer independently of the outer layer. At least one aperture is defined through the three adjacent layers to provide entry of the endoscopic surgical instrument into the cavity. A camera is mounted to receive light from within the cavity, and a monitor is mounted in a position visible from the surgical vantage point. The monitor is coupled to the camera such that the monitor displays images of the cavity.

The second fastener may include a hook-and-loop fastener, and the outer layer may be constructed of a sheet of silicone rubber. The inner layer may be constructed of a closed cell polyethylene foam, and the polyethylene foam may exhibit a density in the range of about 1.8 pcf to about 2.2 pcf.

The at least one wall may be generally curved around the cavity, and the frame may define first and second open sides with the at least one wall defined therebetween. The frame may define a first height when the frame is supported along the first open side and a second height when the frame is supported along the second open side, the second height being substantially greater than the first height.

The at least one aperture defined through the three adjacent layers may include at least one surgical port, such as those ports sold under the trademark SILS™ (Single Incision Laparoscopic Surgery™) by Covidien AG, the surgical port opening having a diameter of at least about 1.1 inches. The at least one aperture defined through the three adjacent layers may include a self closing opening defined through the outer layer to obstruct a view through the opening, the self closing opening formed by intersecting slits defined through the outer layer. The at least one aperture defined through the three adjacent layers may include a plurality of openings spaced from one another by about by about 1.95 inches in a first direction and by about 2.8 inches in a second direction. An illumination source may be defined within the internal cavity.

According to another aspect of the disclosure, an apparatus for simulating a surgical environment includes a mount configured to support an object simulative of human tissue. A shroud for obstructs a view of object simulative of human tissue from a surgical vantage point, and includes first and second open sides with at least one wall defined therebetween. The shroud defines a first height when the shroud is supported along the first open side and a second height when the shroud is supported along the second open side. The second height is substantially greater than the first height. A camera is mounted within the shroud to capture a view of the object simulative of human tissue.

The first height may be about 8.7 inches for simulation of typical laparoscopic procedures and the second height may be about 12.1 inches for simulation of bariatric procedures. The camera may be configured to receive and transmit audio signals to a storage device.

BRIEF DESCRIPTION OF THE DRAWINGS

The accompanying drawings, which are incorporated in and constitute a part of this specification, illustrate embodiments of the present disclosure and, together with the detailed description of the embodiments given below, serve to explain the principles of the disclosure.

DETAILED DESCRIPTION

Figure 1:
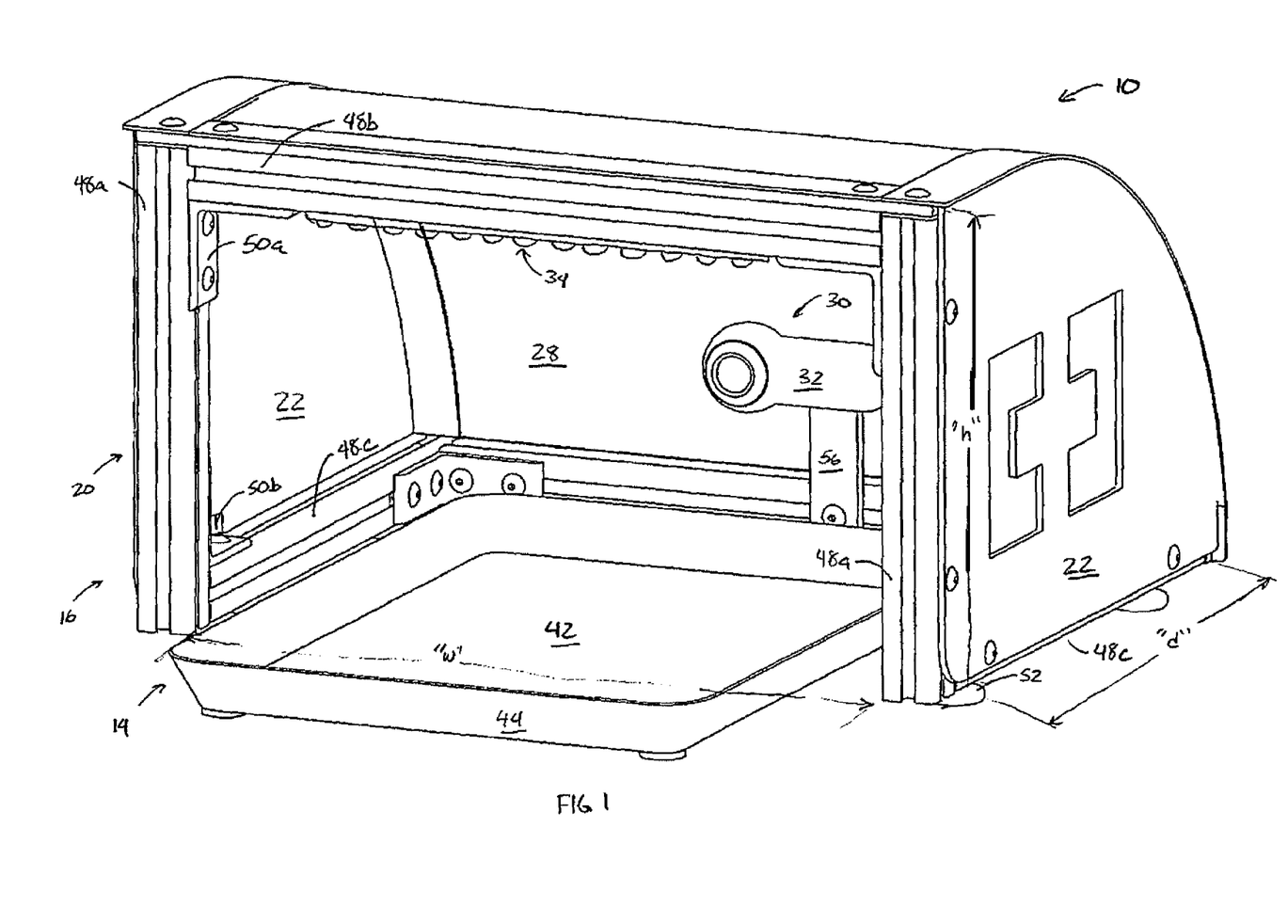
FIG. 1 is a perspective view of an apparatus for simulating a surgical environment in accordance with the present disclosure including a sample tray, a frame, a curve-like simulated abdominal wall, and a visualization system.

Referring initially to FIG. 1, an apparatus 10 for simulating a surgical environment includes a sample tray 14 for supporting tissue or other material to be manipulated in a surgical simulation. The apparatus 10 may be supported on a table or workbench (not shown) so that the sample tray is positioned at a height approximating the height of a patient's abdomen during surgery. In use, a direct view of the sample tray 14 is generally obstructed from the vantage point of a user by a shroud 16. The shroud 16 generally includes a frame 20, a pair of sidewalls 22 and a simulated abdominal wall 28. The simulated abdominal wall 28 is generally curved, and thus permits a user to position the shroud 16 such that the simulated abdominal wall 28 obstructs both a direct front view and a direct overhead view of the sample tray 14. To provide a remote view of the of the sample tray 14, a visualization system 30, including a camera 32 and illumination strips 34 is provided on an interior of the shroud 16.

The sample tray 14 includes a flat bottom 42 and rim 44 projecting from a perimeter of the flat bottom 42. The flat bottom 42 of the tray 14 may support a tissue sample (not shown) or other specimen to be dissected or manipulated in a surgical simulation. The rim 44 permits the tray 14 to contain liquids associated with the sample, or errant portions of the tissue sample generated by the simulation. The tray 14 may be constructed of metal or plastic such that the tray 14 may be easily cleaned once the simulation is complete.

The frame 20 of the shroud 16 includes an arrangement of extruded aluminum bars 48a, 48b and 48c. In the configuration depicted in FIG. 1, the bars 48a define a height "h" operating environment behind the shroud 16, while the bars 48b define a width "w" and the bars 48c define a depth of the shroud 16. Extrusions such as those commercially available from 80/20, Inc. of Columbia City, Ind. may be used as the bars 48a, 48b and 48c. Various brackets, e.g., 50a, 50b that connect the bars 48a, 48b and 48c to one another and to the sidewalls 22 may also be commercially available from 80/20 Inc. The frame 20 also includes adjustable leveling mounts 52 coupled to the extruded bars 48b. The leveling mounts 52 may each include a threaded stud (not shown), which may be threaded into the bars 48b to an appropriate depth to maintain the frame 20 in a level and stable configuration.

The sidewalls 22 facilitate obstructing the view of the sample tray 22 and are curved along one edge to facilitate the maintenance of curvature in the simulated abdominal wall 28. Various materials may be employed for the construction of the sidewalls 22 including aluminum, ABS plastic or an acrylic. Aesthetic considerations may be incorporated into the sidewalls 22 such as various designs or colors.

The simulated abdominal wall 28 is constructed to exhibit a curvature approximating the shape of an insufflated abdomen in a laparoscopic procedure. As described with greater detail below with reference to FIG. 4, the simulated abdominal wall 28 is constructed of various layers to respond to manipulation by a user in a manner similar to the layers of tissue forming an abdominal wall of a patient.

The visualization system 30 includes camera 32 positioned to receive light and sound from within the shroud 16 and mounted to the frame 20 by a mounting arm 56. The mounting arm 56 is configured to position the camera 32 appropriately to ensure that a tissue sample supported in the sample tray 14 is captured in the field of view of the camera 32. The angle of the camera 32 with respect to the sample tray 14 may be adjusted by a hinged connection between the camera 32 and the mounting arm 56. Various commercially available cameras, such as the Logitech® Pro 9000 webcam, may be employed as the camera 32, and the camera 32 may be equipped with pan, tilt, and zoom capabilities.

The visualization system 30 is supported by a pair of lighting strips 34 fastened to one or both of the extruded aluminum bars 48b comprising the frame 20. The lighting strips 34 may comprise adhesive strips of LED lighting elements commercially available from Elemental LED of Emeryville, Calif. These Elemental LED adhesive lighting strips 34 may be cut to an appropriate length, and may be powered by a 12V DC adapter plugged into a standard electrical outlet. In some embodiments, lighting strips 34 may be configured for connection to a USB port of a computer 72 (see FIG. 3), and may be configured to receive power therefrom. The lighting strips 34 may be positioned to direct light downward from bar 48b toward the sample tray 14, and back toward the simulated abdominal wall 28.

Figure 2A:
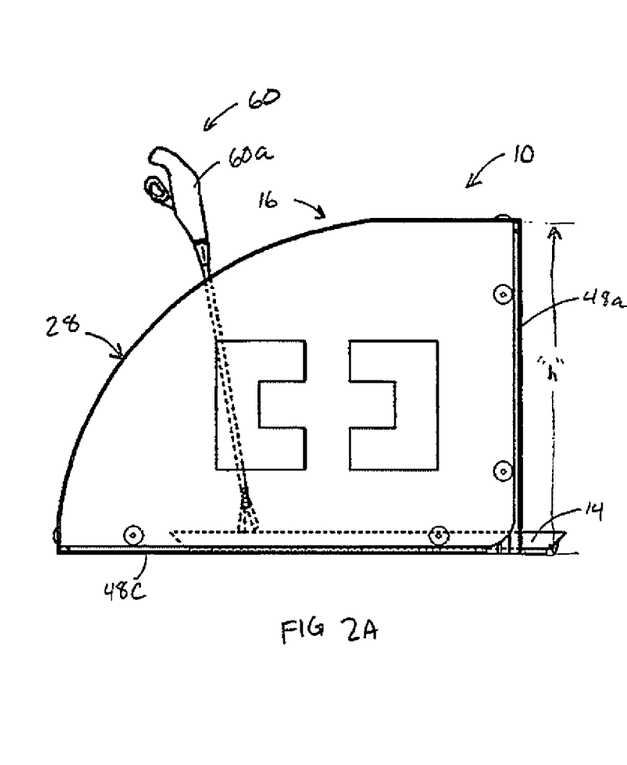
FIG. 2A is a side view of the apparatus of FIG. 1 in a first configuration for simulating a first type of surgical procedure.
Figure 2B:
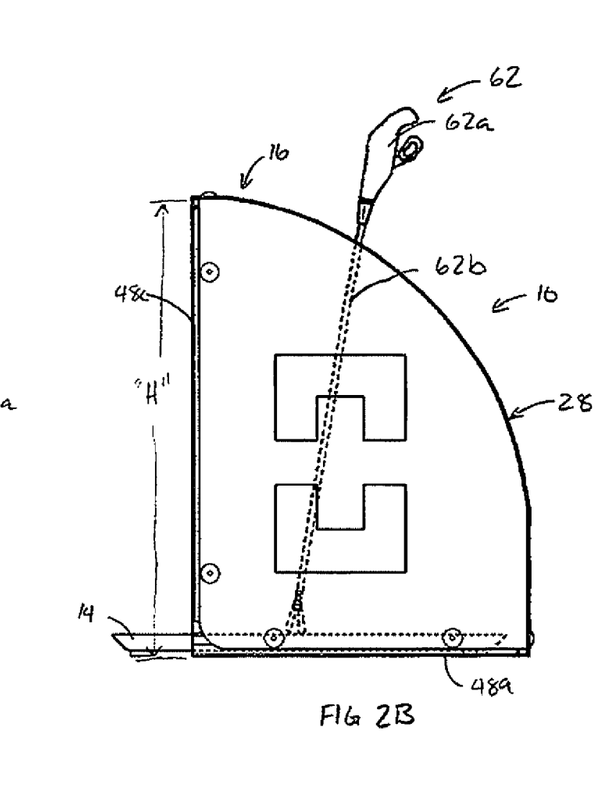
FIG. 2B is a side view of the apparatus of FIG. 1 in a second configuration for simulating a second type of surgical procedure.

Referring now to FIGS. 2A and 2B, the apparatus 10 is depicted in first and second configurations simulating two different types of surgical environments. The first configuration of the apparatus 10 is depicted in FIG. 2A and may simulate a typical laparoscopic surgical environment. The shroud 16 is supported along a first open side, e.g., with the bars 48c of the frame 20 extending horizontally and forming a base for the shroud 16. The first configuration is suitable for use with a first surgical instrument 60, which includes a handle assembly 60a and an elongated shaft 60b. The elongated shaft 60b of the instrument 60 is sized such that the shaft 60b may be positioned through the simulated abdominal wall 28 to provide access to the sample tray 14.

The second configuration of the apparatus 10 is depicted in FIG. 2B wherein the shroud 16 is supported along a second open side, e.g., with the bars 48a of the frame 20 extending horizontally and forming a base for the shroud 16. In the second configuration, the simulated abdominal 28 wall extends to a greater elevation over the sample tray 14 defining an increased height "H" (compare with the height "h" of FIG. 2A). Thus, the second configuration may simulate bariatric laparoscopic procedures wherein a greater thickness of tissue typically separates the body cavity being manipulated from the outside environment. A second surgical instrument 62 for use with the apparatus 10 in the second configuration includes a handle assembly 62a and an elongated shaft 62b, which is generally longer than the shaft 60a.

The two separate configurations of the apparatus 10 permit a user to practice or demonstrate each type of surgical procedure with little or no adjustment to the shroud 16. The shroud may simply be rolled from one side to another. The leveling mounts 52, and the camera 32 may be duplicated to accommodate each configuration of the apparatus, or alternatively, the leveling mounts 52 and camera 32 may be repositioned. The two configurations permit demonstration or training of various techniques that require varying angles of attack and alternate instrumentation.

Figure 3:
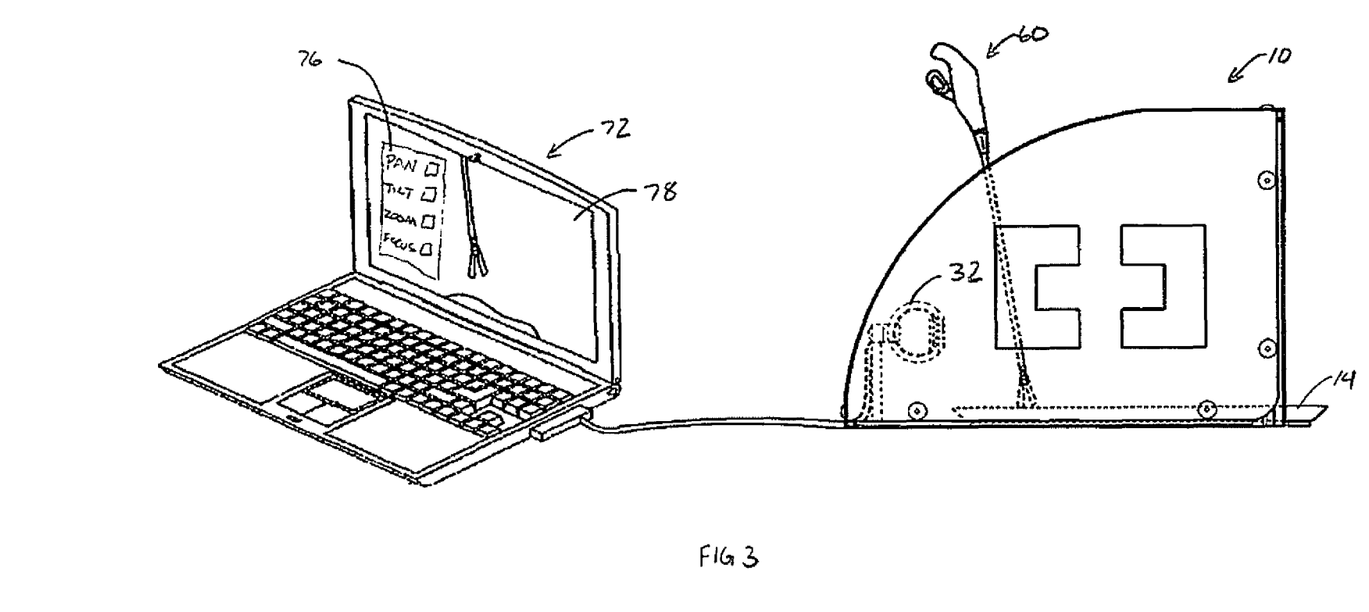
FIG. 3 is a schematic view of a system incorporating the apparatus of FIG. 1.

Referring now to FIG. 3, a system includes the apparatus 10 for simulating a surgical environment and a laptop computer 72 for visualizing the obstructed view of the surgical instrument 60 within the simulated surgical environment. The laptop computer 72 is positioned to be visible from a surgical vantage point and is coupled to the camera 32. The laptop computer 72 is configured to control the camera 32 and to receive and display images on a monitor representative of the views and perspectives available in an actual surgical procedure.

The laptop computer 72 includes a processor (not shown) and may be loaded with software to provide a user interface for the camera 32. The user interface may incorporate a plurality of software programs that work together to streamline the operation of the camera. For example, upon booting up the laptop computer 72, the user may be prompted to simultaneously launch multiple software applications by selecting a single button (not shown) with the use of a macro or batch file. The individual software applications may include webcam software such as the Logitech® Webcam Software available with the camera 32. The webcam software provides control over every variable function of the camera 32 and displays a window 76 on the computer 72 that allows the user to control pan, tilt, zoom and focus features of the camera 32. A webcam companion software such as those available from ArcSoft, Inc. may also be launched. The webcam companion software may specialize in capturing feed from an external camera and providing an optimal refresh rate and may provide a fullscreen view 78 of the simulated operating environment.

The laptop computer 72 may also be configured to record and archive both audio and video signals transmitted from the camera 32. Audio signals often represent commentary of the user that may be useful to review in evaluating the surgical simulation at a later time.

Figure 4:
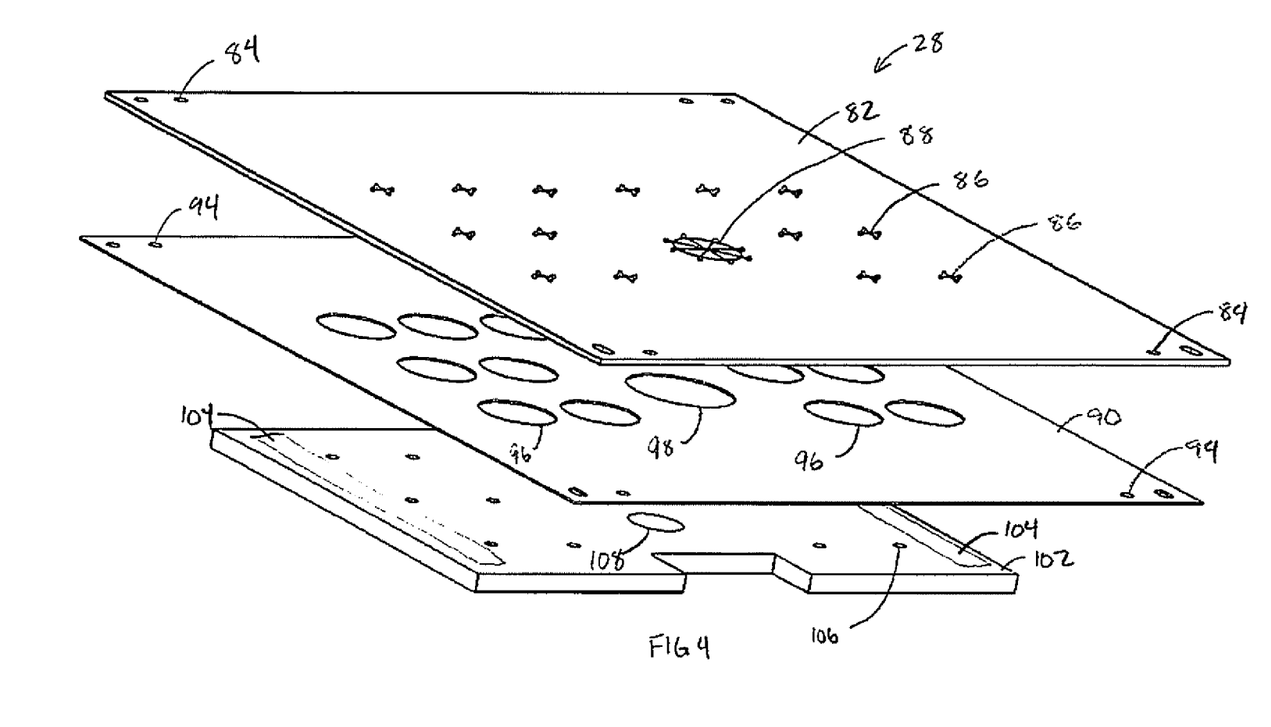
FIG. 4 is an exploded, perspective view of the simulated abdominal wall of FIG. 1.

Referring now to FIG. 4, the simulated abdominal wall 28 includes three distinct layers to simulate the responsiveness of human tissue to surgical manipulation. An outer layer 82 is configured for attachment to the frame 20 (FIG. 1) to define an outer or user-facing surface on an exterior of the shroud 16. The outer layer 82 includes bolt holes 84 to permit the outer layer 82 to be coupled to the frame in a readily removable manner. Various entry points 86 for trocars or narrow instruments, e.g., instrument 60 (see FIG. 3), are distributed over the outer layer 82. The entry points 86 are constructed as a pair of intersecting slits that self close when not in use. The closure of the entry points 86 permits the outer layer 82 to effectively obstruct the view of simulated surgical environment. The entry points 86 are spaced generally by about 1.95 inches in a first direction along the width "w" of the apparatus 10 (FIG. 1) and by about 2.8 inches in a second direction along the depth "d" of the apparatus 10. This spacing may be representative of typical spacing between incisions in actual surgical procedures.

A larger opening 88 is centrally disposed on the outer layer 82 and is configured to receive a surgical port, such as a port sold under the trademark term and referred to as a SILS™ (Single Incision Laparoscopic Surgery™) Port. The outer layer 82 may be constructed of a relatively flexible sheet of silicone rubber to simulate skin tissue. A sheet of silicone rubber having a thickness of about ⅛ inch may be suitable.

An intermediate layer 90 is constructed of a relatively stiff sheet of polystyrene plastic, which may exhibit a thickness of about 0.15 inches, and provides support to the outer layer 82. The intermediate layer 90 includes bolt holes 94 corresponding the bolt holes 84 of the outer layer 82, and thus, the intermediate layer 90 may be affixed to the frame 20 (FIG. 1) along with the outer layer 82. Clearance holes 96 and 98 correspond to the locations of the entry points 86 and surgical port opening 88, respectively. The clearance holes, 96 and 98 are sized to permit free passage of instrumentation therethrough.

An interior layer 102 is constructed of closed cell polyethylene foam to simulate fat or muscle tissue. A foam having a density in the range of about 1.8 pcf to about 2.2 pcf may be suitable. The interior layer 102 is provided with strips of hook-and-loop fasteners 104 securely applied thereto by an adhesive or similar mechanism. The hook-and-loop fasteners 104 permit attachment of the interior layer 102 to corresponding strips of hook-and-loop fasteners (not shown) disposed on an underside of the intermediate layer 90. Since the interior layer 102 is provided with the hook-and-loop fasteners 104, the interior layer 102 may be removable from the shroud 16 (FIG. 1) independently of the outer and intermediate layers 82, 90. Thus, various thicknesses of foam, or foams with alternate material properties may be substituted for the interior layer 102. The simulated abdominal wall 28 is modular to permit simulation of alternate surgical procedures.

Figure 5:
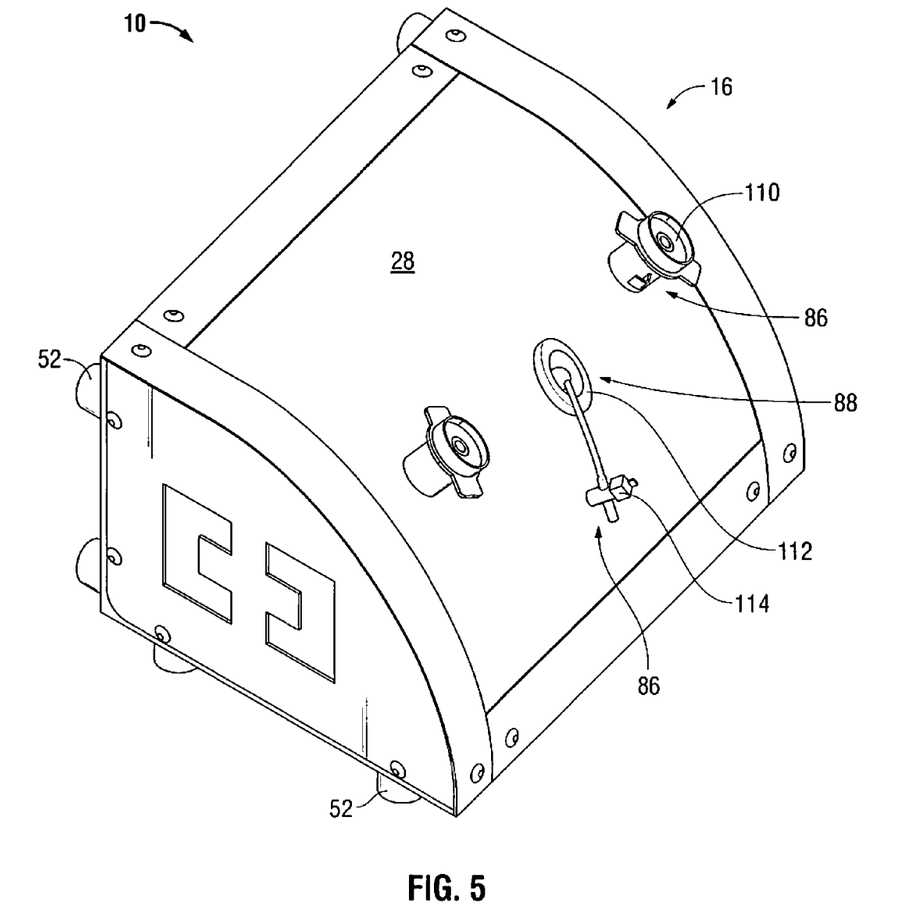
FIG. 5 is a perspective view of the apparatus of FIG. 1 including instrumentation inserted through the simulated abdominal wall.

Referring now to FIG. 5, the apparatus 10 is depicted with instrumentation inserted through the simulated abdominal wall 28. Trocars 110 are inserted through entry points 86, and a surgical port 112, as described herein and otherwise known in the art, is inserted through the surgical port opening 88. An insufflation portal 114 associated with the surgical port 112 is also inserted through an entry point 86. Even with the instrumentation inserted, a view of the simulated operating environment behind the shroud 16 is obstructed.

A first set of leveling mounts is provided on the first side of the shroud 16 for supporting the shroud 16 in the first configuration (see FIG. 2A). A second set of leveling e pair of leveling mounts 52 is provided on the second side of the shroud to support the shroud 16 in the second configuration (see FIG. 2B).

Although the foregoing disclosure has been described in some detail by way of illustration and example, for purposes of clarity or understanding, it will be obvious that certain changes and modifications may be practiced within the scope of the appended claims.

What is claimed is:

1. A surgical simulation system for demonstrating the operation of a laparoscopic surgical instrument, the system comprising:

a frame defining an internal cavity therein;

a mount configured to support an object simulative of human tissue within the cavity;

wherein the frame defines first and second open sides with an at least one wall defined therebetween, said at least one wall simulative of an abdominal wall is generally curved around the cavity, and wherein the frame defines a first height configuration when the frame is supported along the first open side and a second height configuration when the frame is supported along the second open side, the second height configuration being substantially greater than the first height configuration, whereby the at least one wall simulative of the abdominal wall extends to a substantially greater elevation over the object simulative of human tissue within the cavity in the second position than the first position;

the at least one wall coupled to the frame and obstructing a view of the cavity from a surgical vantage point, the at least one wall constructed of three adjacent layers including:

an outer layer simulative of skin tissue, the outer layer coupled to the frame by a first fastener;

an intermediate support layer intimately coupled to the frame; and an inner layer simulative of abdominal tissue, the inner layer coupled to the intermediate support layer by a second fastener such that the inner layer is selectively removable from the intermediate support layer independently of the outer layer;

at least one aperture defined through the three adjacent layers, the at least one aperture configured to provide entry of the endoscopic surgical instrument into the cavity, a camera mountable to receive light from within the cavity; and a monitor mountable in a position visible from the surgical vantage point, the monitor coupled to the camera such that the monitor displays images of the cavity.

2. The surgical simulation system according to claim 1, wherein the second fastener includes a hook-and-loop fastener.

3. The surgical simulation system according to claim 1, wherein the outer layer is constructed of a sheet of silicone rubber.

4. The surgical simulation system according to claim 1, wherein the inner layer is constructed of a closed cell polyethylene foam.

5. The surgical simulation system according to claim 4, wherein the polyethylene foam exhibits a density in the range of about 1.8 pcf to about 2.2 pcf.

6. The surgical simulation system according to claim 1, wherein the at least one wall is generally curved around the cavity.

7. The surgical simulation system according to claim 6, wherein the frame defines first and second open sides with the at least one wall defined therebetween, and wherein the frame defines a first height when the frame is supported along the first open side and a second height when the frame is supported along the second open side, the second height being substantially greater than the first height.

8. The surgical simulation system according to claim 1, wherein the at least one aperture defined through the three adjacent layers includes at least one surgical port opening having a diameter of at least about 1.1 inches.

9. The surgical simulation system according to claim 1, wherein the at least one aperture defined through the three adjacent layers includes a self closing opening defined through the outer layer to obstruct a view through the opening, the self closing opening formed by intersecting slits defined through the outer layer.

10. The simulation system according to claim 1, wherein the at least one aperture defined through the three adjacent layers includes a plurality of openings spaced from one another by about 1.95 inches in a first direction and by about 2.8 inches in a second direction.

11. The surgical simulation system according to claim 1, further comprising an illumination source defined within the internal cavity.

12. An apparatus for simulating a surgical environment, the apparatus comprising:

a mount configured to support an object simulative of human tissue;

a shroud defining an internal cavity, said shroud for obstructing a view of an object simulative of human tissue within the cavity from a surgical vantage point, the shroud including first and second open sides with the at least one wall simulative of an abdominal wall defined therebetween, wherein the at least one wall is generally curved around the cavity, and wherein the shroud defines a first height configuration when the frame is supported along the first open side and a second height configuration when the frame is supported along the second open side, the second height configuration being substantially greater than the first height configuration, whereby the at least one wall simulative of the abdominal wall extends to a substantially greater elevation over the object simulative of human tissue within the cavity in the second position than the first position; and a camera mounted within the shroud to capture a view of the object simulative of human tissue.

13. The apparatus according to claim 12, wherein the first height is about 8.7 inches for simulation of typical laparoscopic procedures and the second height is about 12.1 inches for simulation of bariatric procedures.

14. The apparatus according to claim 12, wherein the camera is configured to receive and transmit audio signals to a storage device.

* * * * *